(12) United States Patent
Dodge

(10) Patent No.: US 7,703,234 B2
(45) Date of Patent: Apr. 27, 2010

(54) FISHING HOOK ENCLOSURE APPARATUS

(75) Inventor: Geoffrey Dodge, South Salem, NY (US)

(73) Assignee: Geoffrey L Dodge, South Salem, NY (US)

( * ) Notice: Subject to any disclaimer, the term of this patent is extended or adjusted under 35 U.S.C. 154(b) by 272 days.

(21) Appl. No.: 11/702,969

(22) Filed: Feb. 6, 2007

(65) Prior Publication Data

US 2007/0157505 A1    Jul. 12, 2007

Related U.S. Application Data

(63) Continuation-in-part of application No. 11/102,113, filed on Apr. 9, 2005, now abandoned, which is a continuation-in-part of application No. 10/762,637, filed on Jan. 23, 2004, now abandoned.

(51) Int. Cl.
   *A01K 87/00* (2006.01)
(52) U.S. Cl. ........................................... 43/25.2
(58) Field of Classification Search .................. 43/25.2; D22/144
   See application file for complete search history.

(56) References Cited

U.S. PATENT DOCUMENTS

| 4,216,604 A | * | 8/1980 | Starke | 43/25.2 |
| 4,452,003 A | * | 6/1984 | Deutsch et al. | 43/25.2 |
| 4,884,357 A | * | 12/1989 | Clifford | 43/25.2 |
| 4,936,040 A | * | 6/1990 | Reiter et al. | 43/25.2 |
| 5,079,863 A | * | 1/1992 | Gillespie | 43/54.1 |
| 5,475,942 A | * | 12/1995 | Tatum | 43/25.2 |
| 5,588,245 A | * | 12/1996 | Vance | 43/25.2 |
| 5,625,977 A | * | 5/1997 | Medford | 43/57.1 |
| 6,301,825 B1 | * | 10/2001 | Doreian | 43/57.1 |
| 7,299,582 B1 | * | 11/2007 | Whitehead | 43/25.2 |
| 2003/0217501 A1 | * | 11/2003 | Jang | 43/25.2 |
| 2005/0091906 A1 | * | 5/2005 | D'Alusio | 43/25.2 |

* cited by examiner

*Primary Examiner*—Christopher P Ellis
(74) *Attorney, Agent, or Firm*—S Michael Bender

(57) ABSTRACT

A fishing hook enclosure apparatus includes a first container portion which includes exterior rod ring/reel attachment means and a first line access notch. A second container portion is attached to the first container portion by first-to-second attachment means which may include a hinge. The exterior rod ring/reel attachment means and the first line access notch are located at opposite ends of the first container portion. Preferably, the exterior rod ring/reel attachment means are in the form of a first attachment portion and a second attachment portion which define a push-through clip. Once a fishing lure and fishing hooks are contained inside the closed container formed by the first container portion and the second container portion in a closed condition, the fishing lure and the fishing hooks are prevented from snagging or hooking into any person or object in the environment surrounding the closed container.

1 Claim, 11 Drawing Sheets

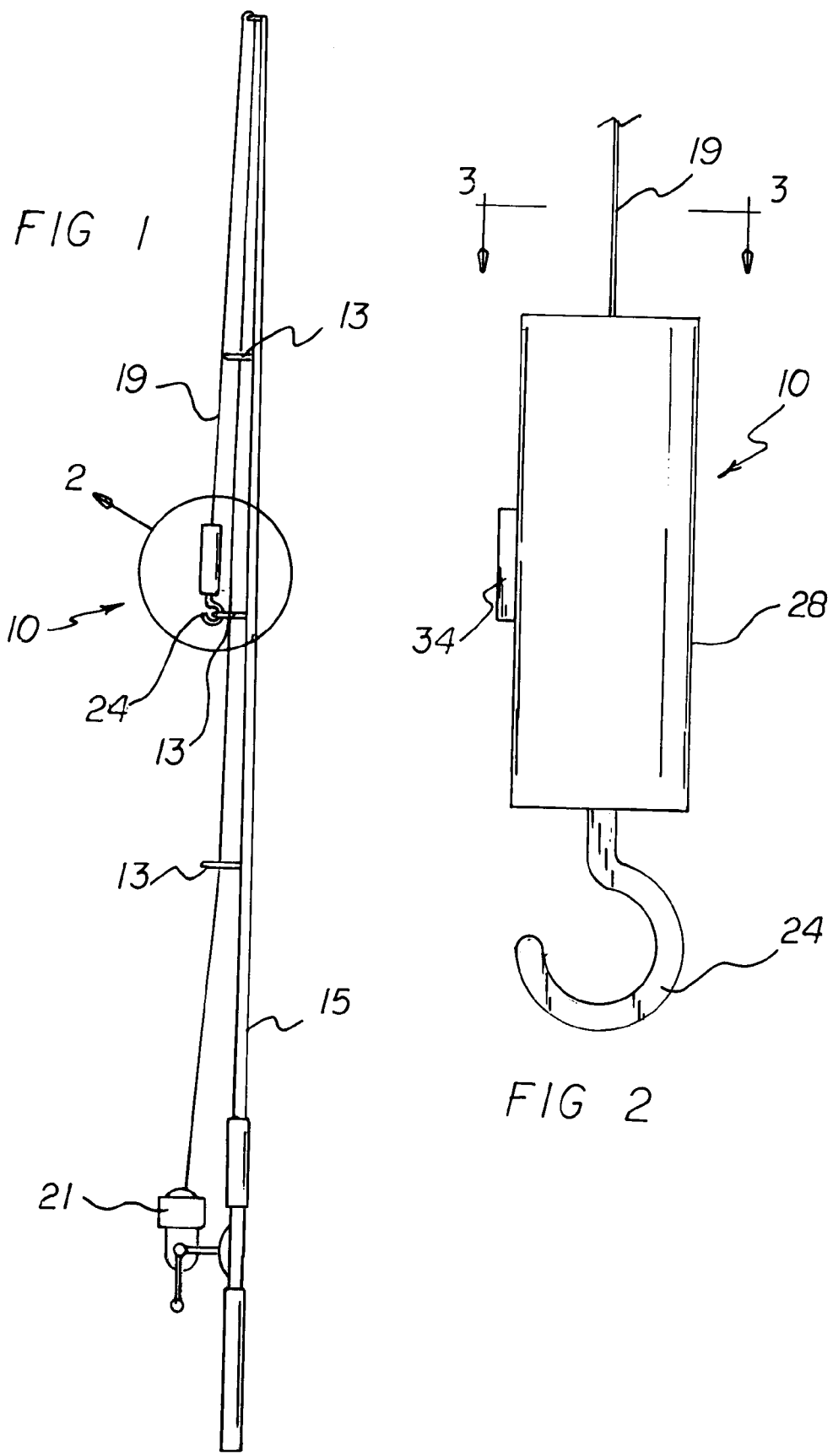

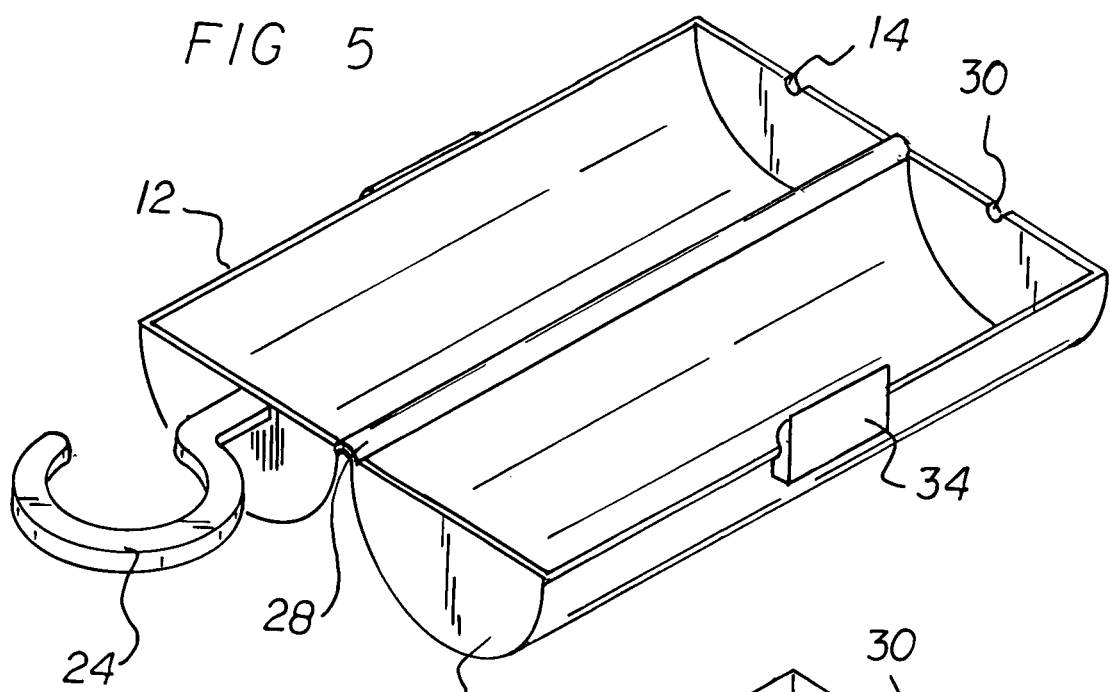
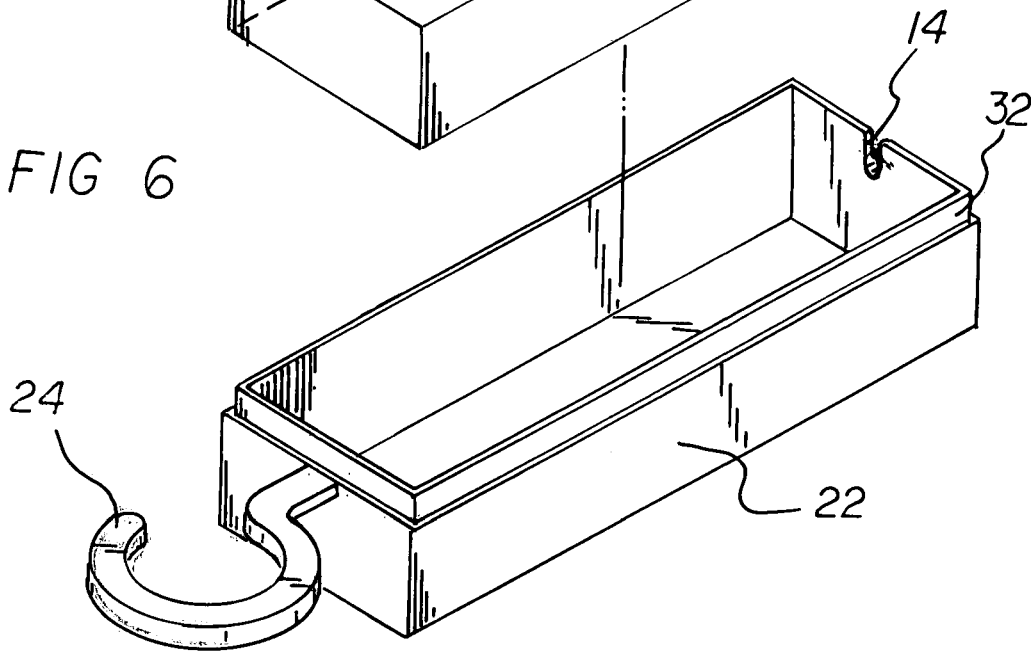

FIG. 13
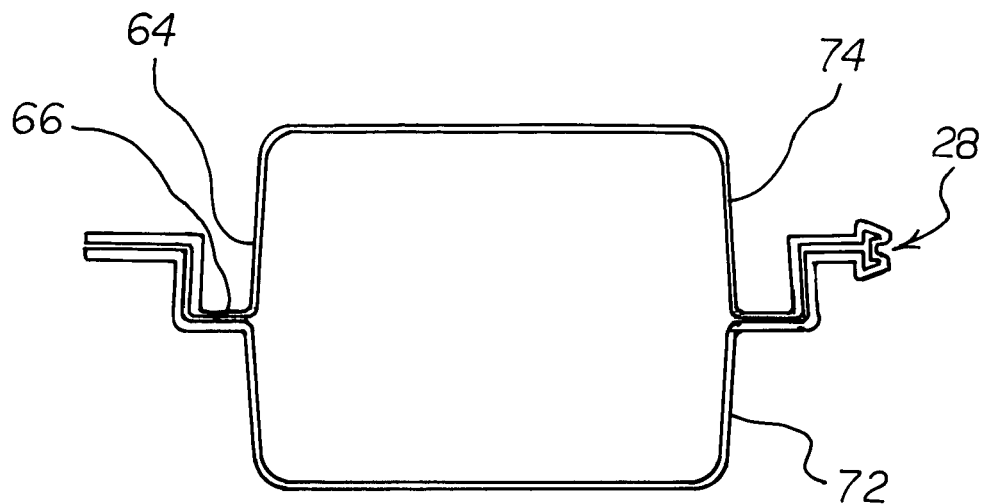
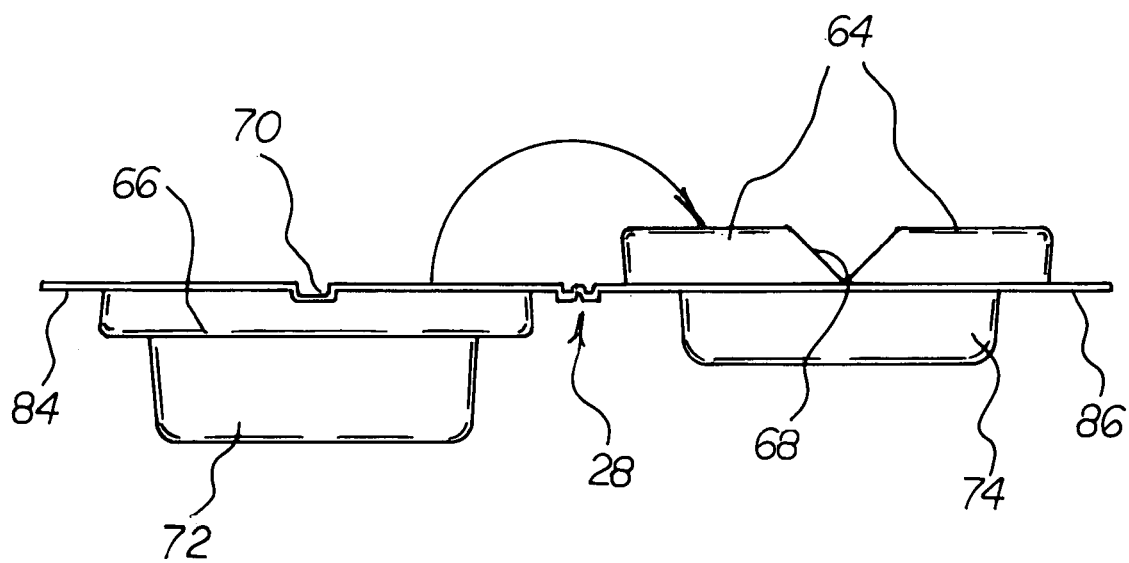
FIG. 14

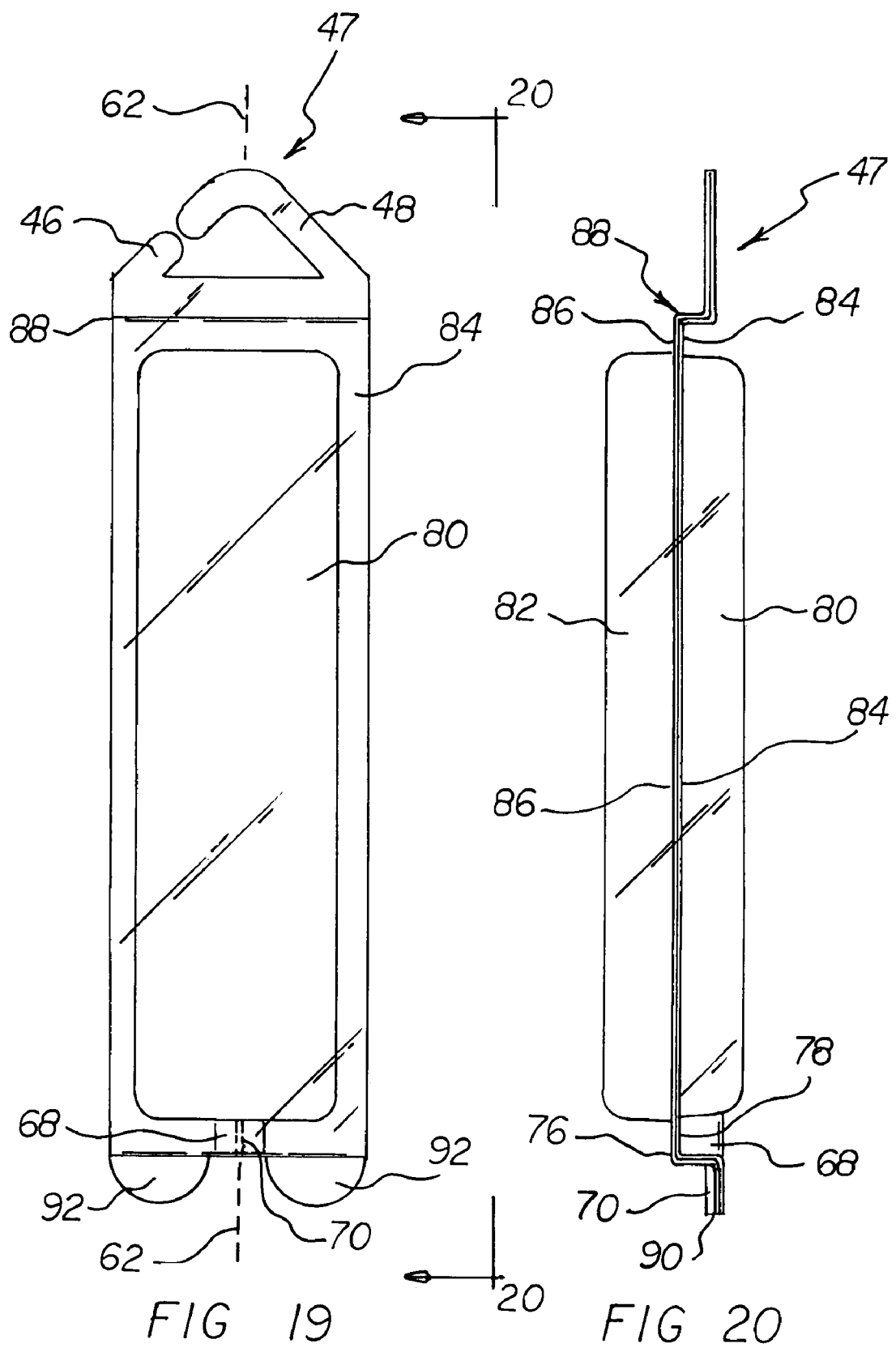

FISHING HOOK ENCLOSURE APPARATUS

CROSS-REFERENCE TO RELATED APPLICATION

This application is a Continuation-In-Part of my Non-Provisional application Ser. No. 11/102,113, filed Apr. 9, 2005 now abandoned, which is a Continuation-In-Part of my Non-Provisional application Ser. No. 10/762,637, filed Jan. 23, 2004 now abandoned, and claims priority based thereon and on any Provisional Application upon which said prior Non-Provisional applications are based (claims priority thereon).

BACKGROUND OF THE INVENTION

1. Field of the Invention

The present invention relates generally to devices for preventing fishing hooks from harming people, and, more particularly, to devices that prevent fishing hooks from harming people and that permit fishing hooks or lures to remain attached to a fishing line that is supported by a fishing rod without harming people.

2. Description of the Prior Art

It is well known that fishing hooks may harm people when they are stored while being left on a fishing line that is wound on a reel attached to a fishing rod. It is also well know that fishing hooks may harm people when they are displayed in a retail environment unless they are packaged to protect persons from contacting the hooks. It would be advantageous if a single fishing hook enclosure were provided that could serve dual purposes, one purpose being to store fishing hooks while being left on a fishing line that is wound on a reel attached to a fishing rod, and another purpose being for display in a retail environment.

A conventional way to put away fishing rods or poles that retain a fishing hook attached to the fishing line is to attach the hook to an eyelet ring on the rod or pole and then tightening the line so that the hook remains in a fixed position on the eyelet ring. However, this technique leaves sharp hooks dangerously exposed. Such exposed hooks can harm people, pets, and adjacent articles, such as car seats. In this respect, it would be desirable if an enclosure were provided for hooks that are attached to lines such that the attached hooks will not cause harm to people, pets, or nearby articles even when the fishing line and hooks are in a tight condition.

Throughout the years, a number of innovations have been developed relating to enclosing a fishing hook or lure in a protective container so that the hook will not cause damage to persons or objects when the hook remains attached to a fishing line on a fishing rod. For example, each of U.S. Pat. Nos. 5,056,256 and 5,220,742 discloses a container that receives a hook which is attached to a fishing line. With each of these containers, the respective container is attached to a fishing rod by clamps which are clamped onto the fishing rod. To avoid the need for extraneous clamps, it would be desirable if a container for a fishing hook or lure were provided that can be attached to a fishing rod without the use of extraneous clamps.

U.S. Pat. No. 5,452,538 discloses a fish hook protector that allows a protected fishing hook to swing freely from a fishing line. The hook protector is not secured to the fishing rod. Rather than permitting a protected fish hook from swinging freely from a fishing line, it would be desirable if a fish hook protector were provided that is secured to a fishing rod so that the protector does not swing freely from the fishing line.

U.S. Pat. No. 5,505,014 discloses a lure protector made of a flexible sheet material that is applied to the lure and its hook to cover up the hook and an eyelet ring on a fishing rod to which the hook is fixed. The flexible material is subject to hook penetration. In this respect, it would be desirable if a lure protector were provided that has rigid walls to protect a hook that is attached to an eyelet ring on the fishing rod.

U.S. Pat. No. 6,014,831 discloses an enclosure that form fits over a single hook to protect the hook from damaging people or objects. Often a plurality of hooks are provided on a fishing lure. Also, it is often desirable to protect a fishing lure from damaging its environment or from being damaged by its environment. Therefore, it would be desirable if a fishing hook and lure protector were provided that encloses and protects all of a plurality of hooks and a lure at the same time.

Still other features would be desirable in a fishing hook enclosure apparatus. It would be desirable if a fishing hook enclosure apparatus could be used as a marketing tool in a large public forum, such as a Bass Masters fishing competition.

Thus, while the foregoing body of prior art indicates it to be well known to use fishing hook enclosures for safety purposes, the prior art described above does not teach or suggest a fishing hook enclosure apparatus which has the following combination of desirable features: (1) provides a single fishing hook enclosure that can serve dual purposes, one purpose being to store fishing hooks while being left on a fishing line that is wound on a reel attached to a fishing rod, and another purpose being for display in a retail environment; (2) provides an enclosure for hooks that are attached to lines, such that the attached hooks will not cause harm to people, pets, or nearby objects even when the fishing line and hooks are in a tight condition; (3) can be attached to a fishing rod without the use of extraneous clamps; (4) is secured to a fishing rod so that the protector does not swing freely from the fishing line; (5) has rigid walls to protect a hook that is attached to an eyelet ring on the fishing rod; and (6) provides a marketing tool in a large public forum, such as a Bass Masters fishing competition. The foregoing desired characteristics are provided by the unique fishing hook enclosure apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a fishing hook enclosure apparatus which includes a first container portion which includes exterior rod ring attachment means and a first line access notch. A second container portion is attached to the first container portion by first-to-second attachment means. The exterior rod ring attachment means and the first line access notch are located at opposite ends of the first container portion. Preferably, the exterior rod ring attachment means are in the form of an exterior attachment hook. Once a fishing lure and fishing hooks are contained inside the closed container formed by the first container portion and the second container portion in a closed condition, the fishing lure and the fishing hooks are prevented from snagging or hooking into any person or object in the environment surrounding the closed container.

In accordance with one embodiment of the invention, the first-to-second attachment means include a hinge. The first container portion is in the form of a first half-cylinder portion; the second container portion is in the form of a second half-cylinder portion; and the hinge connects the first half-cylinder portion and the second half-cylinder portion together. Preferably, a lock is provided for locking the first half-cylinder portion to the second half-cylinder portion when the first half-cylinder portion and the second half-cylinder portion are in a closed condition.

The second half-cylinder portion can also include a second line access notch, and the first line access notch and the second line access notch are placed in registration with each other when the first half-cylinder portion and the second half-cylinder portion are in a closed condition. The first line access notch and the second line access notch form a combined line access notch when the first line access notch and the second line access notch are placed in registration.

In accordance with another embodiment of the invention, the first container portion is in the form of a box-like non-hinged container portion; the second container portion is in the form of a box-like non-hinged lid; and the first-to-second attachment means include a lid engagement flange on the non-hinged container portion which receives the non-hinged lid.

In accordance with yet another embodiment of the invention, the first-to-second attachment means include a hinge. The first container portion is in the form of a first half-spherical portion; the second container portion is in the form of a second half-spherical portion; and the hinge connects the first half-spherical portion and the second half-spherical portion together. Preferably, a lock is provided for locking the first half-spherical portion to the second half-spherical portion when the first half-spherical portion and the second half-spherical portion are in a closed condition.

The second half-spherical portion can also include a second line access notch, and the first line access notch and the second line access notch are placed in registration with each other when the first half-spherical portion and the second half-spherical portion are in a closed condition. The first line access notch and the second line access notch form a combined line access notch when the first line access notch and the second line access notch are placed in registration.

With another class of embodiments of the invention, a fishing hook enclosure apparatus is provided for a fishing rod which has a plurality of rod rings and a reel, wherein the fishing hook enclosure apparatus includes a first container portion which includes exterior rod ring/reel attachment means and a first line access notch. A second container portion is attached to the first container portion by first-to-second attachment means.

The exterior rod ring/reel attachment means include a first attachment portion which is connected to the first-to-second attachment means, near a first end thereof. A second attachment portion is connected to the first-to-second attachment means, near a second end thereof, wherein a distal end of the first attachment portion and a distal end of the second attachment portion are juxtaposed with respect to each other. The distal end of the first attachment portion and the distal end of the second attachment portion are laterally flexible with respect to each other.

With another embodiment of the invention, the exterior rod ring/reel attachment means include a first attachment arm which is connected to the first container portion. The first attachment arm includes a first arm riser portion which is connected to the first container portion and a first arm transverse portion which is connected to the first arm riser portion. A second attachment arm is connected to the second container portion. The second attachment arm includes a second arm riser portion which is connected to the second container portion and a second arm transverse portion which is connected to the second arm riser portion. The first arm transverse portion and the second arm transverse portion overlap each other when the first container portion is closed with respect to the second container portion.

The exterior rod ring/reel attachment means and the first line access notch are located along a longitudinal axis.

With one embodiment of the invention, the first-to-second attachment means are arranged parallel to the longitudinal axis.

With another embodiment of the invention, the first-to-second attachment means are arranged transverse to the longitudinal axis.

The first container portion is in the form of a box-like container portion, and a second container portion is in the form of a box-like lid. The box-like container portion includes a first outer lip, and the box-like lid includes a second outer lip.

The first container portion includes a first container-to-container locking portion, and the second container portion includes a second container-to-container locking portion, such that the first container portion is locked with respect to the second container portion when the first container-to-container locking portion is in engagement with the second container-to-container locking portion.

The first container-to-container locking portion can be in the form of a peripheral locking tongue, and the second container-to-container locking portion can be in the form of a peripheral locking groove, such that the first container portion is locked with respect to the second container portion when the peripheral locking tongue is in tight friction-fit engagement with the peripheral locking groove.

The first line access notch can be in the form of a V-shaped first indentation in the peripheral locking tongue, and the second line access notch can be in the form of a rectangular-shaped second indentation in the peripheral locking groove.

The first container portion is in the form of a first shell-like container portion, and the second container portion is in the form of a second shell-like container portion.

The first shell-like container portion includes a first outer lip, and the second shell-like container portion includes a second outer lip. The first outer lip is in registration with the second outer lip when the first shell-like container portion is closed with respect to the second shell-like container portion.

The first container-to-container locking portion can be in the form of a convex locking tab, and the second container-to-container locking portion can be in the form of a concave locking tab, such that the first container portion is locked with respect to the second container portion when the convex locking tab is in tight friction-fit engagement with the concave locking tab. The convex locking tab is connected to the first outer lip, and the concave locking tab is connected to the second outer lip.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fishing hook enclosure apparatus which has all of the advantages of the prior art and none of the disadvantages.

It is another object of the present invention to provide a new and improved fishing hook enclosure apparatus which may be easily and efficiently manufactured and marketed.

It is a further object of the present invention to provide a new and improved fishing hook enclosure apparatus which is of durable and reliable construction.

An even further object of the present invention is to provide a new and improved fishing hook enclosure apparatus which is susceptible of a low cost of manufacture with regard to both materials and labor, and which accordingly is then susceptible of low prices of sale to the consuming public, thereby making such fishing hook enclosure apparatus available to the buying public.

Still yet a further object of the present invention is to provide a new and improved fishing hook enclosure apparatus which provides a single fishing hook enclosure that can serve dual purposes, one purpose being to store fishing hooks while being left on a fishing line that is wound on a reel attached to a fishing rod, and another purpose being for display in a retail environment.

Still another object of the present invention is to provide a new and improved fishing hook enclosure apparatus that provides an enclosure for hooks that are attached to lines, such that the attached hooks will not cause harm to people, pets, or nearby objects even when the fishing line and hooks are in a tight condition.

Yet another object of the present invention is to provide a new and improved fishing hook enclosure apparatus which can be attached to a fishing rod without the use of extraneous clamps.

Even another object of the present invention is to provide a new and improved fishing hook enclosure apparatus that is secured to a fishing rod so that the protector does not swing freely from the fishing line.

Still a further object of the present invention is to provide a new and improved fishing hook enclosure apparatus which has rigid walls to protect a hook that is attached to an eyelet ring on the fishing rod.

Yet another object of the present invention is to provide a new and improved fishing hook enclosure apparatus that provides a marketing tool in a large public forum, such as a Bass Masters fishing competition.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a side view showing a first embodiment of the fishing hook enclosure apparatus of the invention, in use, enclosing a fishing lure and hook and secured to a ring on a fishing rod, wherein the first container portion is in the form of a first half-cylinder portion, and the second container portion is in the form of a second half-cylinder portion.

FIG. 2 is an enlarged side view of the embodiment of the fishing hook enclosure apparatus shown in FIG. 1, contained in circled region 2, and removed from the ring and the fishing rod.

FIG. 5 is perspective view of the embodiment of the invention shown in FIGS. 1-4 in an open condition.

FIG. 6 is an exploded perspective view of a second embodiment of the invention in which a non-hinged lid fits on a non-hinged container portion.

FIG. 13 is a cross-sectional view of the embodiment of the invention shown in FIG. 10, taken along line 13-13 thereof.

FIG. 14 is a bottom edge view of the embodiment of the invention shown in FIG. 10, wherein the box-like lid has been opened with respect to the box-like container portion by rotation around a hinge which is oriented parallel to a longitudinal axis between exterior rod ring/reel attachment means and a first line access notch.

FIG. 19 is top view of a seventh embodiment of the invention wherein the exterior rod ring/reel attachment means include a first attachment portion and a second attachment portion having distal ends juxtaposed together, wherein a hinge is oriented transverse to a longitudinal axis between exterior rod ring/reel attachment means and a first line access notch, wherein a first shell-like container portion and a second shell-like container portion fit together along a first outer lip and a second outer lip, wherein a V-shaped first indentation is provided in the first outer lip, and wherein container-to-container locking portions include a concave locking tab and a convex locking tab which lock together with a snap action.

FIG. 20 is a side edge view of the embodiment of the invention shown in FIG. 19, taken along line 20-20 thereof.

DESCRIPTION OF THE PREFERRED EMBODIMENT

Figure 3:
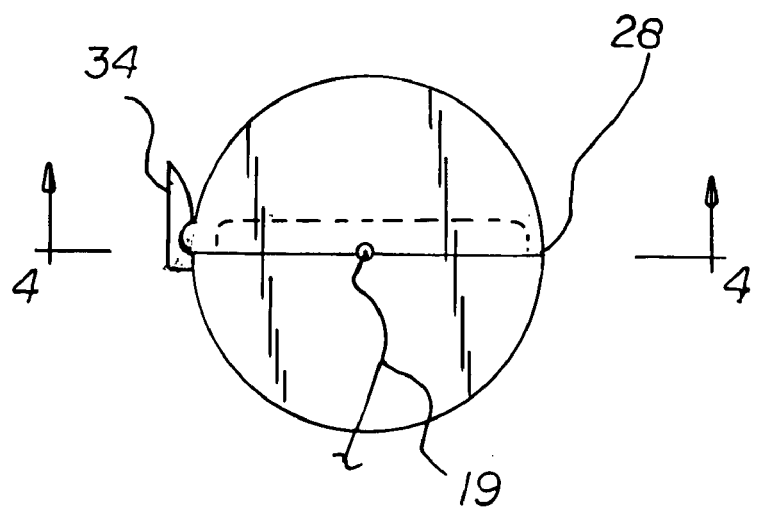
FIG. 3 is a top view of the embodiment of the fishing hook enclosure apparatus of FIG. 2 taken along line 3-3 thereof.
Figure 4:
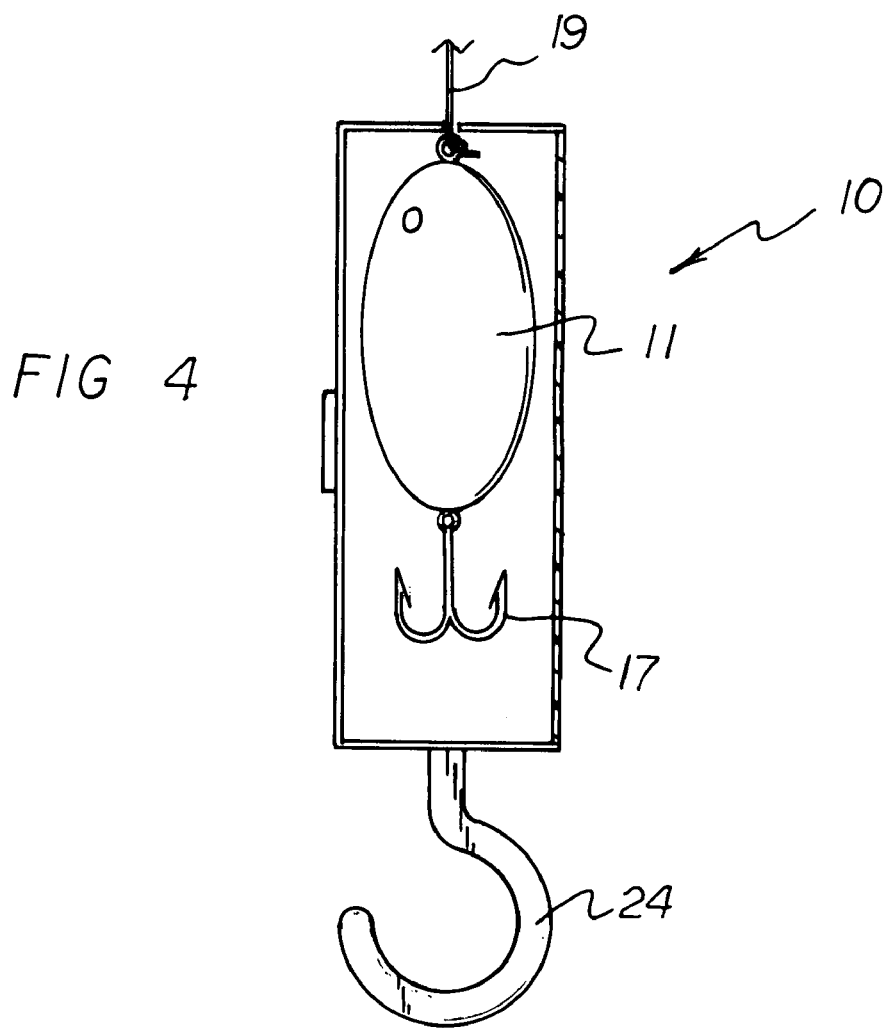
FIG. 4 is a cross-sectional view of the embodiment of the invention shown in FIG. 3 taken along line 4-4 thereof.

With reference to the drawings, a new and improved fishing hook enclosure apparatus embodying the principles and concepts of the present invention will be described.

Turning to FIGS. 1-5, there is shown a first embodiment of the fishing hook enclosure apparatus of the invention generally designated by reference numeral 10. In the first embodiment, fishing hook enclosure apparatus 10 includes a first container portion which includes exterior rod ring attachment means and a first line access notch 14. A second container portion is attached to the first container portion by first-to-second attachment means. The exterior rod ring attachment means and the first line access notch 14 are located at opposite ends of the first container portion. Preferably, the exterior attachment means are in the form of an exterior attachment hook 24. The first container portion and the second container portion are made from rigid material.

In accordance with one embodiment of the invention, the first-to-second attachment means includes a hinge 28. The first container portion is in the form of a first half-cylinder portion 12; the second container portion is in the form of a second half-cylinder portion 26; and the hinge 28 connects the first half-cylinder portion 12 and the second half-cylinder portion 26 together. Preferably, a lock 34 is provided for locking the first half-cylinder portion 12 to the second half-cylinder portion 26 when the first half-cylinder portion 12 and the second half-cylinder portion 26 are in a closed condition.

The second half-cylinder portion 26 can also include a second line access notch 30, and the first line access notch 14 and the second line access notch 30 are placed in registration with each other when the first half-cylinder portion 12 and the second half-cylinder portion 26 are in a closed condition. The first line access notch 14 and the second line access notch 30 form a combined line access notch when the first line access notch 14 and the second line access notch 30 are placed in registration.

Turning to FIG. 6, a second embodiment of the invention is shown. Reference numerals are shown that correspond to like reference numerals that designate like elements shown in the other figures. In addition, the first container portion is in the form of a box-like non-hinged container portion 22; the second container portion is in the form of a box-like non-hinged lid 20; and the first-to-second attachment means include a lid engagement flange 32 on the non-hinged container portion 22 which receives the non-hinged lid 20.

To use the first embodiment of the invention, the lock 34 is unlocked, and the second half-cylinder portion 26 is rotated around the first half-cylinder portion 12 along the hinge 28 to provide the open condition shown in FIG. 5. A fishing lure 11 which includes fishing hooks 17 is laid inside the first half-cylinder portion 12, and the second half-cylinder portion 26 is rotated around the hinge 28 to form the closed condition as shown in FIGS. 1-4. Before the closed condition is provided, the fishing line 19 is positioned in the first line access notch 14. When the second half-cylinder portion 26 is closed with respect to the first half-cylinder portion 12 in the closed condition, the fishing line 19 is positioned in the combined line access notch formed by the first line access notch 14 and the second line access notch 30 which are in registration with each other. Once the fishing lure 11 and the fishing hooks 17 are contained inside the closed container formed by the first half-cylinder portion 12 and the second half-cylinder portion 26, the fishing lure 11 and the fishing hooks 17 are prevented from snagging or hooking into any person or object in the environment surrounding the closed container.

Once the fishing lure 11 and fishing hooks 17 are contained inside the closed container, the closed container can be stabilized with respect to the fishing rod 15 in the following manner. The exterior attachment hook 24 of the fishing hook enclosure apparatus 10 is hooked onto a selected rod ring 13 on the fishing rod 15. Once the exterior attachment hook 24 is hooked onto the selected ring 13, the reel 21 is operated to tighten the fishing line 19. When this is done, the tightened fishing line 19 secures the exterior attachment hook 24 onto the selected ring 13 so that the closed container is secured in a fixed position on the fishing rod 15.

To use the fishing lure 11 and the fishing hooks 17, the reel 21 is operated to reduce the tension on the fishing line 19 so that the exterior attachment hook 24 can be unhooked from the ring 13. Then, the closed container is opened and the fishing lure 11 and fishing hooks 17 are removed from the container. Then, the container is placed in some location for storage until needed again.

Use of the second embodiment of the invention is similar to the use of the first embodiment of the invention with the following differences. When the apparatus is in the open condition, the non-hinged lid 20 is removed from the non-hinged container portion 22. When the apparatus is in the closed container, the non-hinged lid 20 is placed on the non-hinged container portion 22 with the non-hinged lid 20 engaging the lid engagement flange 32 on the non-hinged container portion 22.

Figure 7:
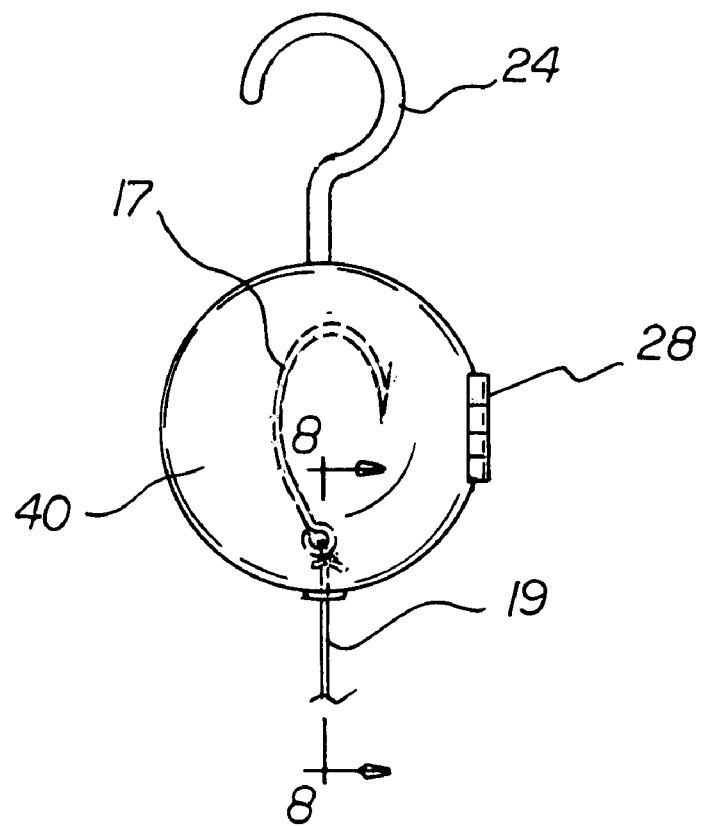
FIG. 7 is a side view showing a third embodiment of the fishing hook enclosure apparatus of the invention, in use, enclosing a fishing lure and hook, wherein the first container portion is in the form of a first half-spherical portion, and the second container portion is in the form of a second half-spherical portion.
Figure 8:
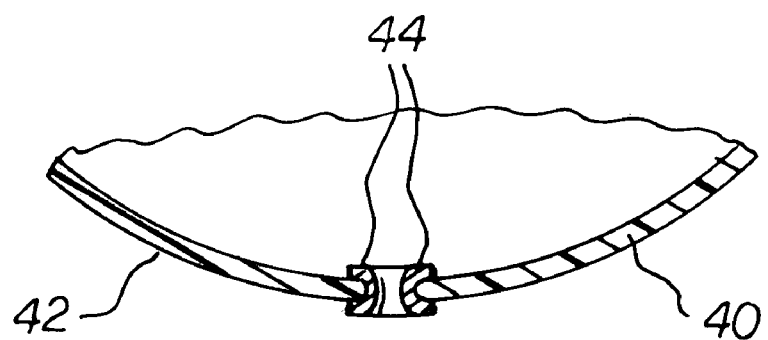
FIG. 8 is an enlarged cross-sectional view of the bottom portion of FIG. 7 taken along line 8-8 thereof.
Figure 9:
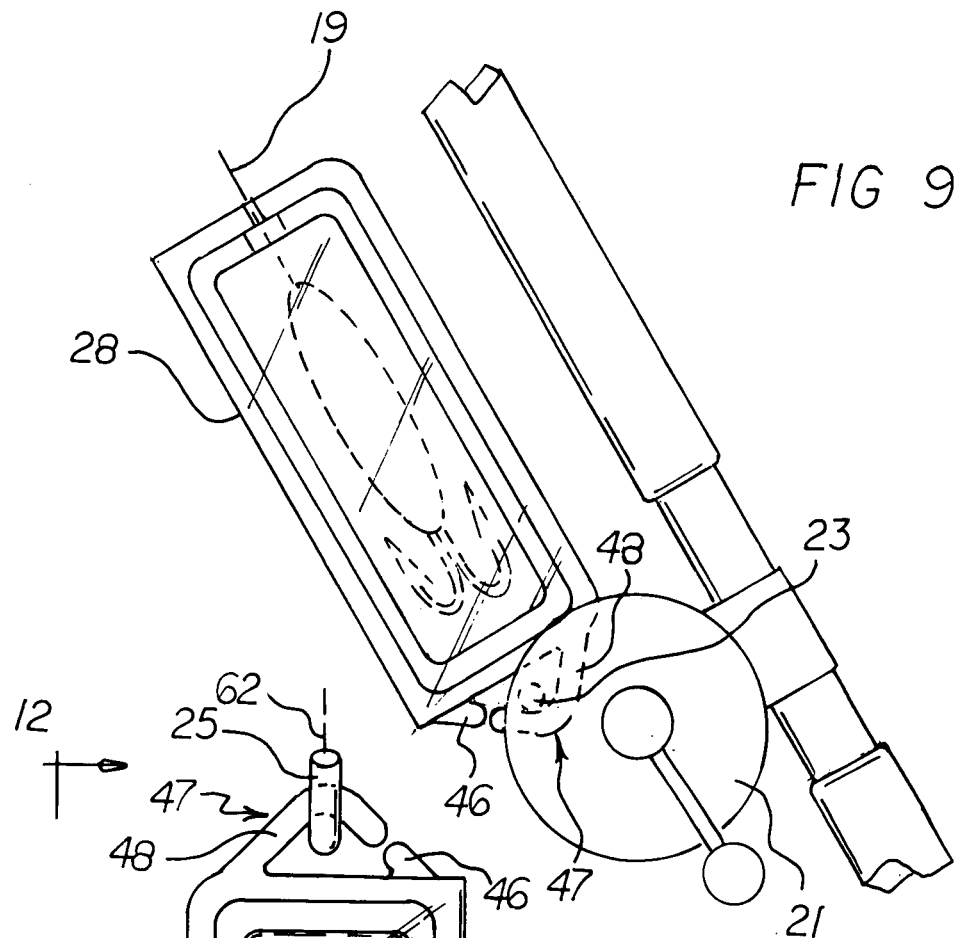
FIG. 9 is a top view of a fourth embodiment of the invention which is attached to a reel bar of a reel and which contains a fishing lure attached to a fishing line.
Figure 10:
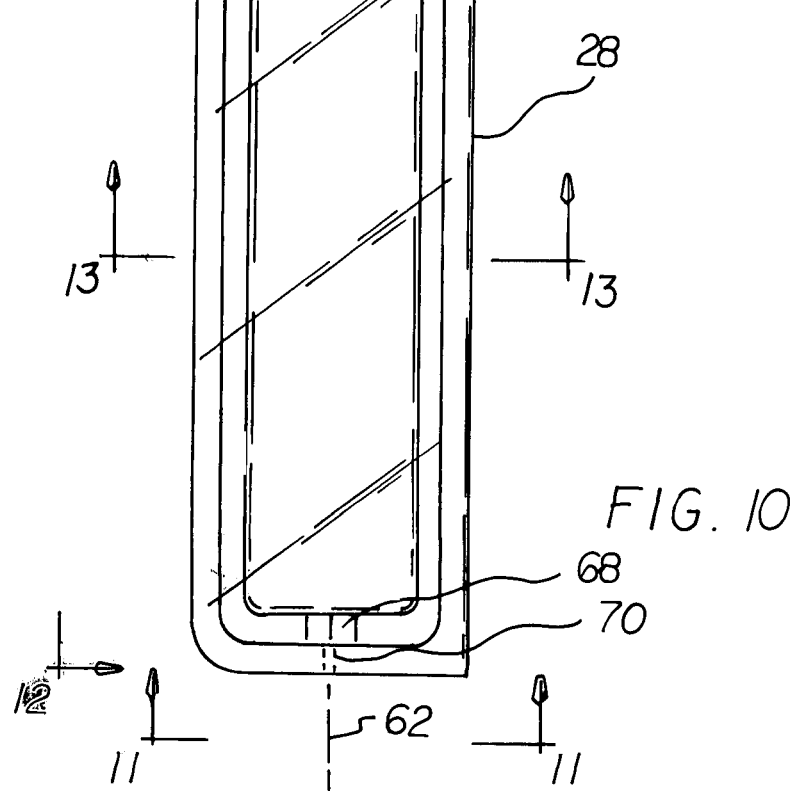
FIG. 10 is an enlarged top view of the embodiment of the invention shown in FIG. 9, wherein the embodiment is hanging from a store display rod by means of exterior rod ring/reel attachment means which include a first attachment portion and a second attachment portion which is juxtaposed to the first attachment portion.
Figure 11:
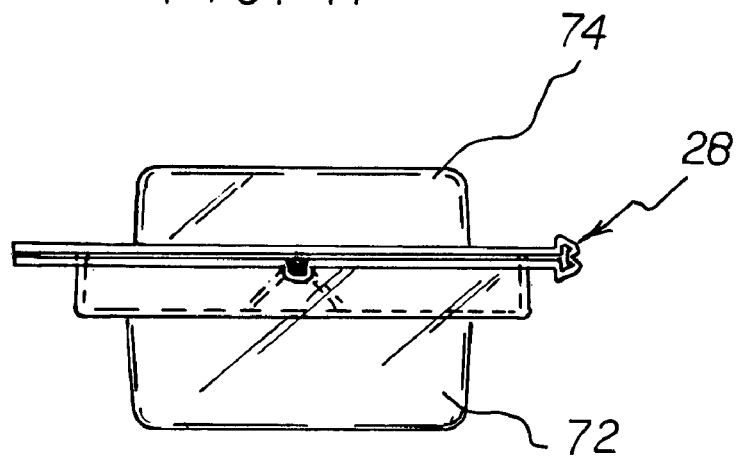
FIG. 11 is a bottom edge view of the embodiment of the invention shown in FIG. 10, taken along line 11-11 thereof.
Figure 12:
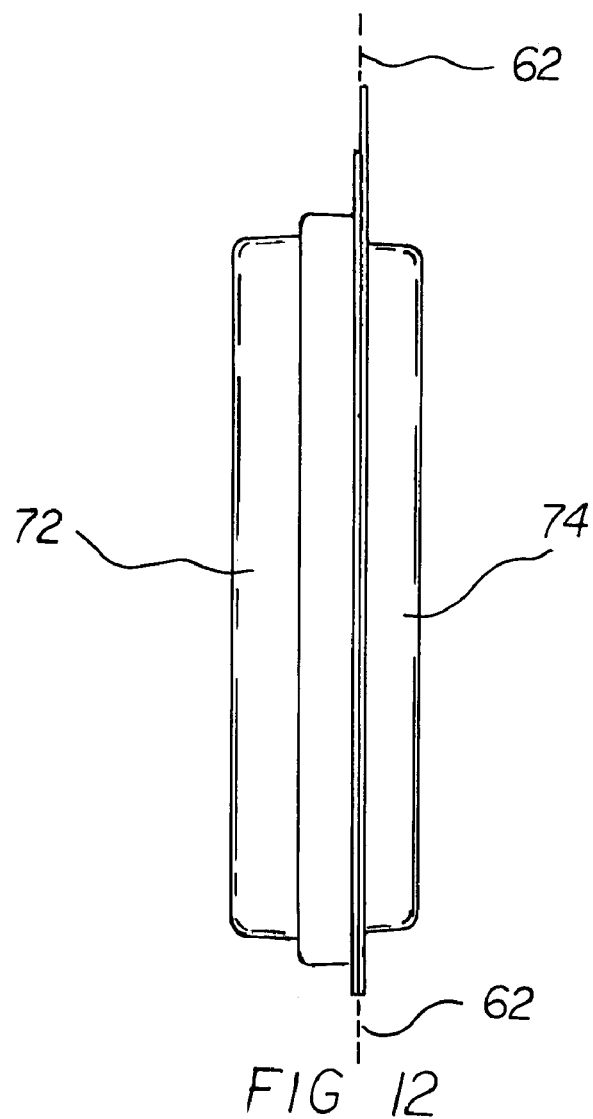
FIG. 12 is a side edge view of the embodiment of the invention shown in FIG. 10, taken along line 12-12 thereof.
Figure 15:
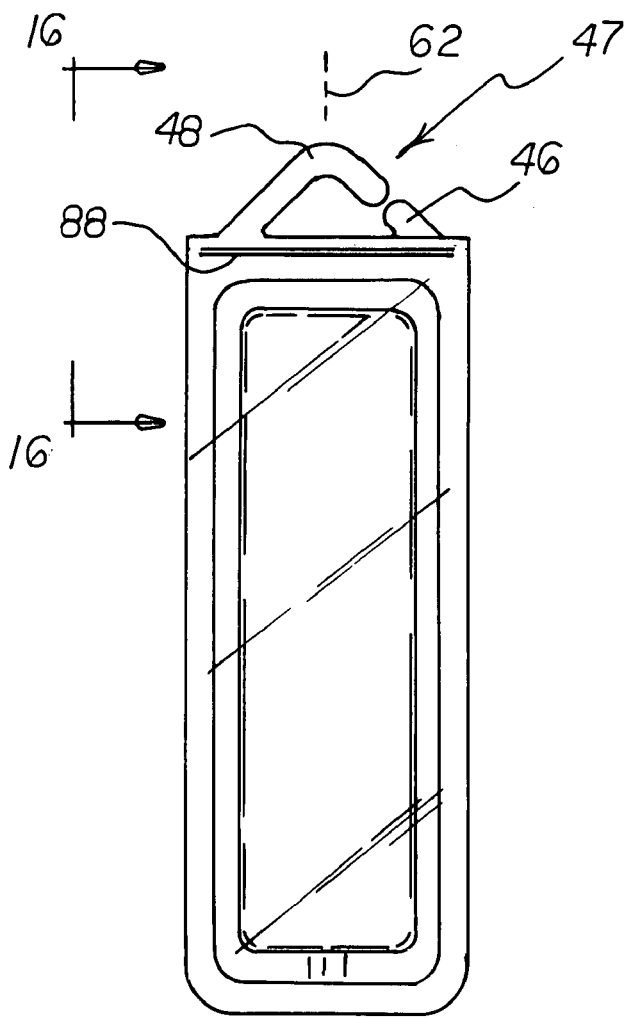
FIG. 15 is a top view of a fifth embodiment of the invention, wherein a hinge is provided which is oriented transverse to a longitudinal axis between exterior rod ring/reel attachment means and a first line access notch, and wherein the transverse hinge is located adjacent to the exterior rod ring/reel attachment means.
Figure 16:
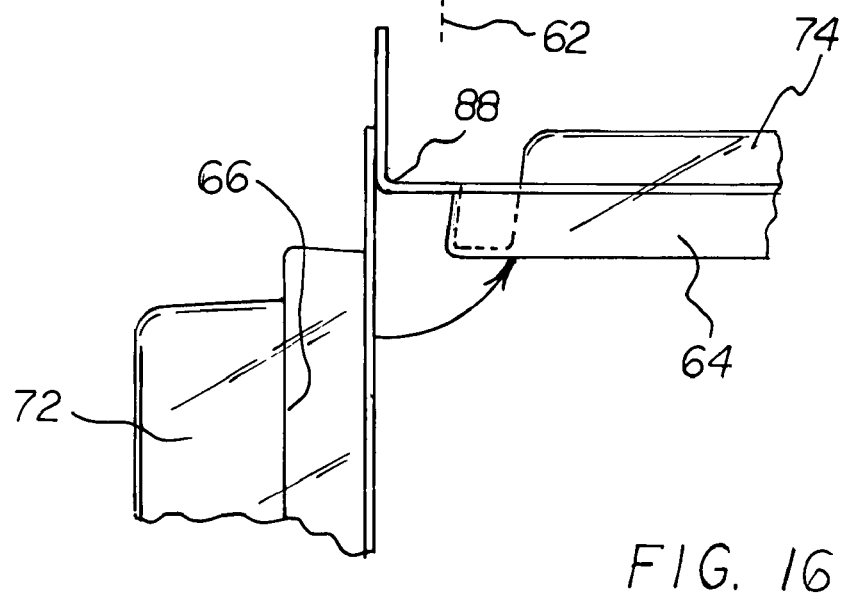
FIG. 16 is an enlarged side view of a portion of the embodiment of the invention shown in FIG. 15, taken along line 16-16 thereof.

Turning to FIGS. 7 and 8, a third embodiment of the fishing hook enclosure apparatus of the invention is shown. In FIG. 7, the apparatus is in use, enclosing a fishing lure and hook. With this embodiment of the invention, the first container portion is in the form of a first half-spherical portion 40, and the second container portion is in the form of a second half-spherical portion 42.

FIG. 8 is an enlarged cross-sectional view of the bottom portion of FIG. 7 taken along line 8-8 thereof. As shown, each of the first line access notch 14 and the second line access notch 30 includes a respective rubber grommet 44. The rubber grommets 44 permit the fishing line to contact a soft surface when the fishing hook enclosure apparatus is in use holding a fishing hook 17. Also, the rubber grommets 44 help prevent the fishing line 19 from snagging against the respective access notches.

With another class of embodiments of the invention, a fishing hook enclosure apparatus 10 is provided for a fishing rod which has a plurality of rod rings 13 and a reel 21, wherein the fishing hook enclosure apparatus 10 includes a first container portion which includes exterior rod ring/reel attachment means and a first line access notch 14. A second container portion is attached to the first container portion by first-to-second attachment means.

As shown in FIGS. 9 to 16, 21, and 22, the exterior rod ring/reel attachment means include a first attachment portion 46 which is connected to the first-to-second attachment means, near a first end thereof. A second attachment portion 48 is connected to the first-to-second attachment means, near a second end thereof, wherein a distal end of the first attachment portion 46 and a distal end of the second attachment portion 48 are juxtaposed with respect to each other. The distal end of the first attachment portion 46 and the distal end of the second attachment portion 48 are laterally flexible with respect to each other.

With a preferred embodiment, as substantially illustrated, the first attachment portion 46 and the second attachment portion 48 define a push-through clip 47 which generally is triangular shaped with an opening defined by a slight spacing between the distal end of each attachment portion being located in one leg of the triangle.

Figure 17:
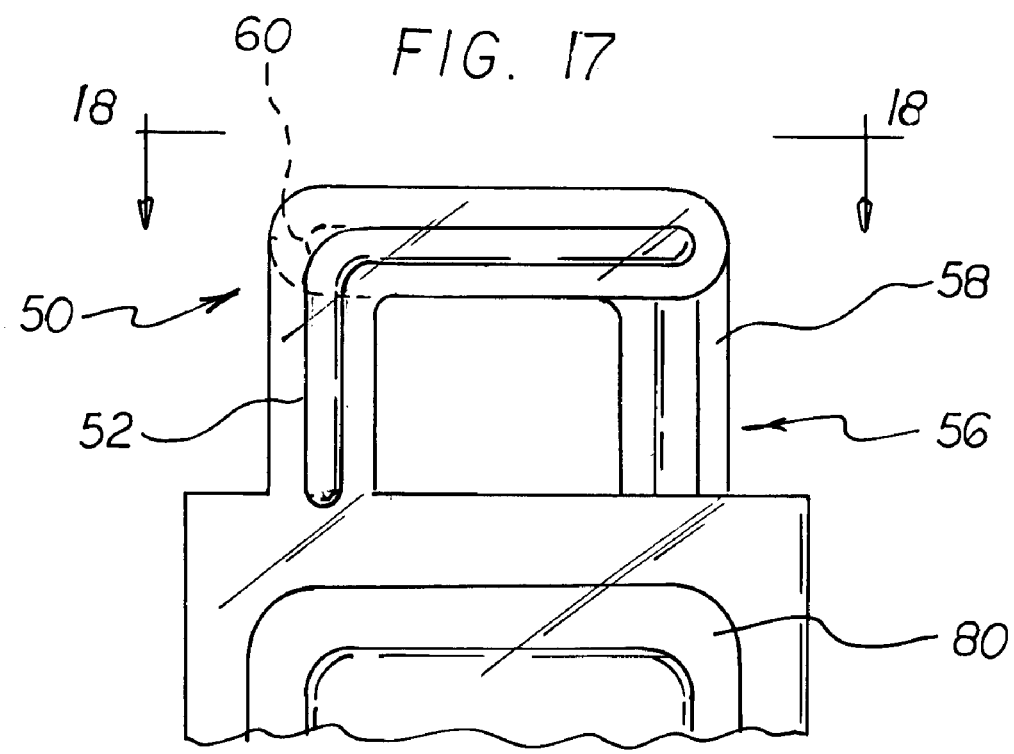
FIG. 17 is an enlarged top portion of a sixth embodiment of the invention which includes exterior rod ring/reel attachment means which include a first attachment arm and a second attachment arm, wherein the first attachment arm includes a first arm riser portion and a first arm transverse portion, and wherein the second attachment arm includes a second arm riser portion and a second arm transverse portion, and wherein the first arm transverse portion overlaps with the second arm transverse portion.
Figure 18:
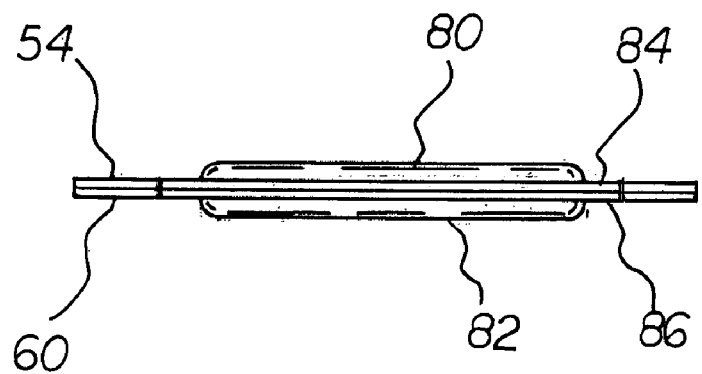
FIG. 18 is a top edge view of the embodiment of the invention shown in FIG. 17, taken along line 18-18 thereof.
Figure 21:
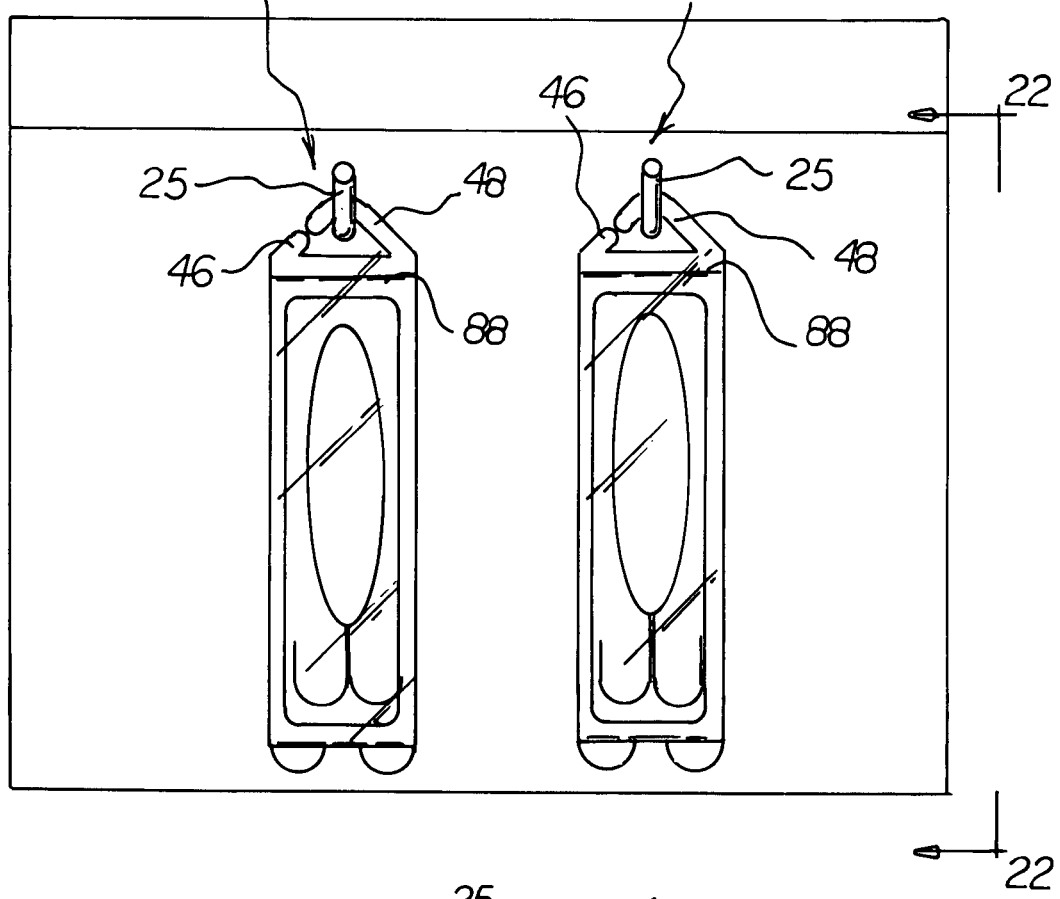
FIG. 21 is front view of a wall-mounted display, including store display rods, for mounting a plurality of embodiments of the invention.
Figure 22:
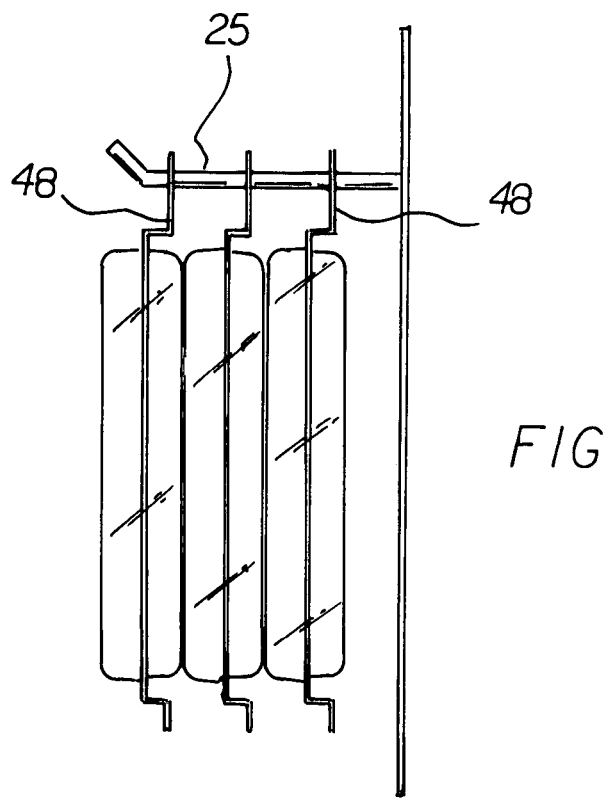
FIG. 22 is a side view of the wall-mounted display shown in FIG. 21, taken along line 22-22 thereof.

As shown in FIGS. 17 and 18, with another alternately preferred embodiment of the invention, the exterior rod ring/reel attachment means include a first attachment arm 50 which is connected to the first container portion. The first attachment arm 50 includes a first arm riser portion 52 which is connected to the first container portion and a first arm transverse portion 54 which is connected to the first arm riser portion 52. A second attachment arm 56 is connected to the second container portion. The second attachment arm 56 includes a second arm riser portion 58 which is connected to the second container portion and a second arm transverse portion 60 which is connected to the second arm riser portion 58. The first arm transverse portion 54 and the second arm transverse portion 60 overlap each other when the first container portion is closed with respect to the second container portion.

The exterior rod ring/reel attachment means and the first line access notch 14 are located along a longitudinal axis 62. With one preferred embodiment of the invention, the first-to-second attachment means are arranged parallel to the longitudinal axis 62. With another alternatively preferred embodiment of the invention, the first-to-second attachment means are arranged transverse to the longitudinal axis 62.

As shown in FIGS. 9 to 16, the first container portion is in the form of a box-like container portion 72, and a second container portion is in the form of a box-like lid 74. The box-like container portion 72 includes a first outer lip 84, and the box-like lid 74 includes a second outer lip 86.

The first container portion includes a first container-to-container locking portion, and the second container portion includes a second container-to-container locking portion, such that the first container portion is locked with respect to the second container portion when the first container-to-container locking portion is in engagement with the second container-to-container locking portion.

The first container-to-container locking portion can be in the form of a peripheral locking tongue 64, and the second container-to-container locking portion can be in the form of a peripheral locking groove 66, such that the first container portion is locked with respect to the second container portion when the peripheral locking tongue 64 is in tight friction-fit engagement with the peripheral locking groove 66.

The first line access notch can be in the form of a V-shaped first indentation 68 in the peripheral locking tongue 64, and the second line access notch can be in the form of a rectangular-shaped second indentation 70 in the peripheral locking groove 66.

More specifically, when the box-like lid 74 is locked with respect to the box-like container portion 72, the peripheral locking tongue 64 is in engagement with the peripheral locking groove 66, and the second outer lip 86 is in registration with the first outer lip 84. Also, the top portion of the V-shaped first indentation 68 is in registration with the rectangular-shaped second indentation 70.

Alternatively, the second indentation 70 can be located in a flange portion 90 of the first outer lip 84. The second indentation 70 is in registration with the V-shaped first indentation 68. Tabs 92, as shown in FIG. 19, can be provided for facilitating the disengagement of the concave locking tab 76 from the convex locking tab 78 to open the first shell-like container portion 80 with respect to the second shell-like container portion 82, around the transversely oriented hinge 88 which is transversely oriented with respect to the longitudinal axis 62.

As shown in FIGS. 17 to 21, the first container portion is in the form of a first shell-like container portion 80, and the second container portion is in the form of a second shell-like container portion 82.

The first shell-like container portion 80 includes a first outer lip 84, and the second shell-like container portion 82 includes a second outer lip 86. The first outer lip 84 is in registration with the second outer lip 86 when the first shell-like container portion 80 is closed with respect to the second shell-like container portion 82.

The first container-to-container locking portion can be in the form of a convex locking tab 78, and the second container-to-container locking portion can be in the form of a concave locking tab 76, such that the first container portion is locked with respect to the second container portion when the convex locking tab 78 is in tight friction-fit engagement with the concave locking tab 76. In this respect, the concave locking tab 76 and the convex locking tab 78 can lock together with a snap action. The convex locking tab 78 is connected to the first outer lip 84, and the concave locking tab 76 is connected to the second outer lip 86. If desired, the V-shaped first indentation 68 can project upward from the convex locking tab 78, and the second indentation 70 can be located in a handle portion extending outward from the top of the convex locking tab 78, as shown in FIGS. 19 and 20.

The most preferred features of the fishing hook enclosure apparatus of the invention are illustrated in a number of figures. The most preferred exterior rod ring/reel attachment means are comprised of the first attachment portion 46 and the second attachment portion 48 illustrated in FIGS. 9, 10, 15, and 21. The most preferred first container portion and second container portion are comprised of the first shell-like container portion 80 with includes first outer lip 84 and the second shell-like container portion 82 which includes second outer lip 86, as shown in FIGS. 17 to 22. The most preferred orientation of the hinge 88 is the transverse orientation of the hinge 88 which is shown in FIGS. 15, 16, 21, and 22. The most preferred container-to-container locking portions are shown in FIGS. 19, 20, 21, and 22 which contain a concave locking tab 76 and a convex locking tab 78 that snap together with a friction fit. The most preferred embodiment of the invention can be referred to as LURE SMART™.

The most preferred first shell-like container portion 80, first outer lip 84, convex locking tab 78, V-shaped first indentation 68, first layer of the first attachment portion 46, and first layer of the second attachment portion 48 can be made as a unified, integrated first structural unit. Similarly, the most preferred second shell-like container portion 82, second outer lip 86, concave locking tab 76, second layer of the first attachment portion 46, and second layer of the second attachment portion 48 can be made as a unified, integrated second structural unit.

The most preferred first structural unit and second structural unit are bonded together to form the full apparatus of the invention by bonding the first layer of the first attachment portion 46 to the second layer of the first attachment portion 46 and by bonding the first layer of the second attachment portion 48 to the second layer of the second attachment portion 48. In this way, the final first attachment portion 46 and the final second attachment portion 48 are double layered. In this respect, the transversely oriented hinge 88 presents itself between the two layers of the double-layered structure.

If desired, though not illustrated in the Figures, the first container portion and the second container portion can be formed so that when they are placed together, they provide an ornamental appearance of a number of objects such as an oil filter (such as a Purolator Oil Filter). A beer can (such as a Busch Beer can), or a container for smokeless tobacco (such as for Skoal Smokeless Tobacco).

In addition, the first container portion and the second container portion can contain logos associated with a wide variety of commercial products, especially products associated with fishing and other water-oriented sports. By way of example, the fishing hook enclosure apparatus can be made from commercially available relatively inexpensive plastic material (e.g. polyvinyl chloride) using known thermoforming techniques and/or plastic injection molding techniques.

The components of the fishing hook enclosure apparatus of the invention can be made from inexpensive and durable metal and plastic materials. Preferably, the plastic materials can be made from recycled plastic materials.

The fishing hook enclosure apparatus of the invention can serve a dual service. In addition to the service stated hereinabove with respect to a being supported by a fishing rod and rod ring, the fishing hook enclosure apparatus can be used as packaging for a retail display and sales.

Another benefit of employing the fishing hook enclosure apparatus of the invention is that fishing hooks or lures can be stored along with fishing line and a fishing rod, without removing the fishing hooks and lures from the fishing line and rod.

If desired, the fishing hook enclosure apparatus can be made from different colors. Also, the fishing hook enclosure apparatus can bear the name of a manufacturer or logo of any product, such as a beverage or a fishing lure. The fishing hook enclosure apparatus can bear the name of a sponsor for fishing events.

In addition, a fishing hook enclosure apparatus of the invention can be made from opaque materials so that the design of a fishing lure could be kept secret from competitors in a fishing contest, such as a Bass Masters fishing competition.

If desired, the first container portion and the second container portion can slide together without using a hinge. In this case, the first container portion would have a fishing-line-reception slot at one end, and an exterior attachment hook can be located at the other end. For advertising purposes, the fishing hook enclosure apparatus can be in the form of a beverage can, a box of a medicine, or a box of a toiletry product.

If desired, the first container portion and the second container portion can be fish shaped.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved fishing hook enclosure apparatus that is low in cost, relatively simple in design and operation, and which may advantageously be used to provide a single fishing hook enclosure that can serve dual purposes, one purpose being to store fishing hooks while being left on a fishing line that is wound on a reel attached to a fishing rod, and another purpose being for display in a retail environment. With the invention, a fishing hook enclosure apparatus provides an enclosure for hooks that are attached to lines, such that the attached hooks will not cause harm to people, pets, or nearby objects even when the fishing line and hooks are in a tight condition. With the invention, a fishing hook enclosure apparatus is provided which can be attached to a fishing rod without the use of extraneous clamps. With the invention, a fishing hook enclosure apparatus is provided which is secured to a fishing rod so that the protector does not swing freely from the fishing line. With the invention, a fishing hook enclosure apparatus is provided which has rigid walls to protect a hook that is attached to an eyelet ring on the fishing rod. With the invention, a fishing hook enclosure apparatus provides a marketing tool in a large public forum, such as a Bass Masters fishing competition.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A fishing hook enclosure apparatus for a fishing rod which has a plurality of rod rings and a reel, comprising:

a first container portion which includes exterior rod ring/reel attachment means and a first line access notch, and a second container portion attached to said first container portion by first-to-second attachment means, wherein said exterior rod ring/reel attachment means include a first attachment portion connected to said first-to-second attachment means, near a first end thereof, and
a second attachment portion connected to said first-to-second attachment means, near a second end thereof,
wherein a distal end of said first attachment portion and a distal end of said second attachment portion are juxtaposed with respect to each other, and
wherein said distal end of said first attachment portion and said distal end of said second attachment portion are laterally flexible with respect to each other,
wherein said first attachment portion and said second attachment portion define a push-through clip which generally is triangular shaped with an opening defined by a slight spacing between the distal end of each said attachment portion being located in one leg of the triangle,
wherein said exterior rod ring/reel attachment means and said first line access notch are located along a longitudinal axis,
wherein said first-to-second attachment means includes a hinge having a hinge axis arranged substantially parallel to said longitudinal axis,
wherein said first container portion is in the form of a box-like container portion,
said second container portion is in the form of a box-like lid,
said first container portion and said second container portion being adapted to be closed relative to each other about said hinge axis,
wherein said box-like container portion includes a first outer peripheral lip, and said box-like lid includes a second outer peripheral lip, respectively,
wherein said first container portion includes a first container-to-container locking portion,
said second container portion includes a second container-to-container locking portion,
such that said first container portion is adapted to be locked with respect to said second container portion when said first container-to-container locking portion is in engagement with said second container-to-container locking portion when said first container portion is closed relative to said second container portion,
wherein said first container-to-container locking portion is in the form of a peripheral locking tongue, and
said second container-to-container locking portion is in the form of a peripheral locking groove,
such that said first container portion is adapted to be locked with respect to said second container portion when said peripheral locking tongue is in tight friction-fit engagement with said peripheral locking groove,
wherein said first line access notch is in the form of a V-shaped first indentation in said peripheral locking tongue, and said second line access notch is in the form of a rectangular-shaped second indentation in said peripheral locking groove,
wherein said first container portion is in the form of a first shell-like container portion,
second container portion is in the form of a second shell-like container portion,
wherein said first shell-like container portion includes a first outer peripheral lip,
said second shell-like container portion includes a second outer peripheral lip,
said first outer peripheral lip is in registration with said second outer peripheral lip when said first shell-like container portion is closed with respect to said second shell-like container portion, and
wherein said distal end of said first attachment portion and said distal end of said second attachment portion are attached to said first outer peripheral lip and said second outer peripheral lip, respectively, to define said push-through clip which generally is triangular shaped.

* * * * *